United States Patent [19]

Piotrowski

[11] 4,063,868
[45] Dec. 20, 1977

[54] MOLD DEVICE FOR THE PRODUCTION OF HOLLOW BODIES FROM THERMOPLASTIC MATERIALS

[75] Inventor: Tadeusz Piotrowski, Montreuil, France

[73] Assignee: Worson S.A., Geneva, Switzerland

[21] Appl. No.: 711,144

[22] Filed: Aug. 3, 1976

Related U.S. Application Data

[63] Continuation of Ser. No. 468,994, May 10, 1975, abandoned, and a continuation of Ser. No. 220,334, Jan. 24, 1972, abandoned.

[30] Foreign Application Priority Data

Jan. 29, 1971 Switzerland ............... 001377/71

[51] Int. Cl.² ............................................. B29D 23/03
[52] U.S. Cl. .................................. 425/533; 425/537
[58] Field of Search ............ 425/DIG. 203, DIG. 211, 425/DIG. 209, DIG. 232, DIG. 233, DIG. 208, DIG. 210, 242 B, 387 B, 326 B, 302 B, 305 B, 340, 395, 533, 537; 264/96, 97

[56] References Cited

U.S. PATENT DOCUMENTS

| 3,016,669 | 1/1962 | Grosclaude | 425/DIG. 209 |
| 3,029,468 | 4/1962 | Valyi | 425/387 R |
| 3,616,491 | 11/1971 | Vollers | 425/DIG. 209 |
| 3,640,665 | 2/1972 | Seefluth | 425/326 B |

FOREIGN PATENT DOCUMENTS 642,609 5/1964 Belgium ................ 425/DIG. 203

Primary Examiner—Richard B. Lazarus
Attorney, Agent, or Firm—Young & Thompson

[57] ABSTRACT

The mold device is arranged to produce hollow bodies having at least one undercut formed by a radially offset circumferential wall portion, and includes a hollow mold and a movable mold plate which are interconnected during at least the mold closing and opening phases. The hollow mold is formed by a one-piece main body and a plural-part auxiliary body, with the latter forming the undercut. The parts of the auxiliary body are radially movable normal to the axis of the hollow mold through at least the radial extent of the undercut so that, when the parts of the auxiliary body have been moved outwardly, the produced thermoplastic material body can be removed axially from the main body of the hollow mold. The hollow mold is a blow mold operatively associated with an injection mold which is used to produce a preform of the hollow body which is then blow molded, in the hollow mold, to the desired shape.

1 Claim, 4 Drawing Figures

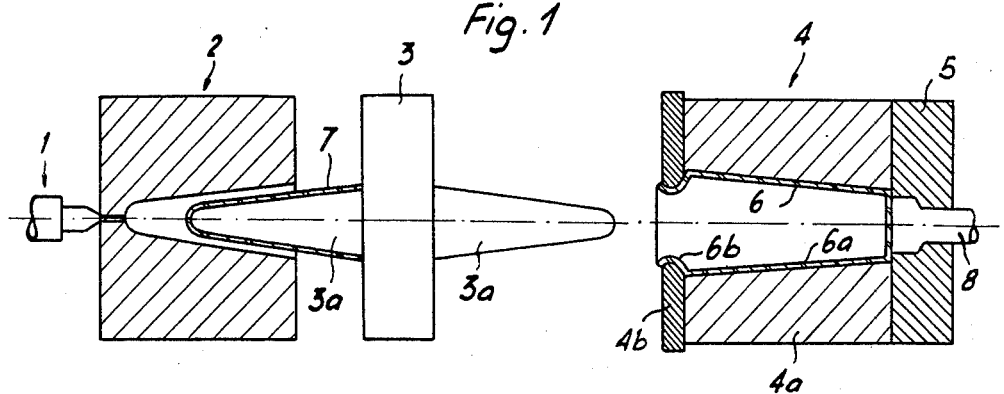
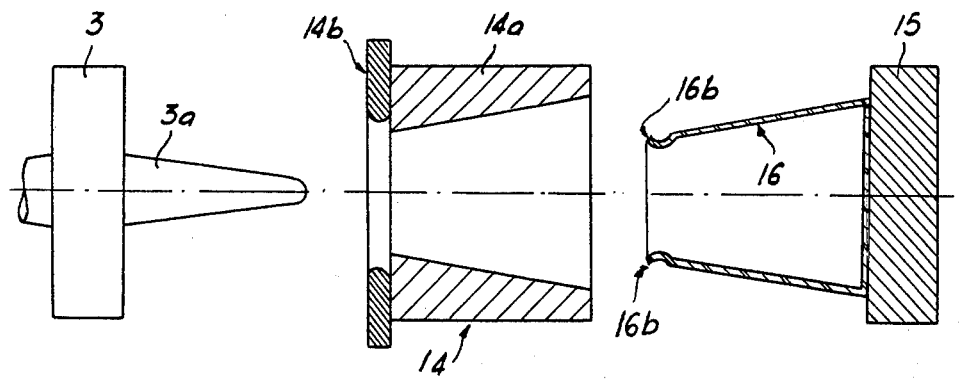
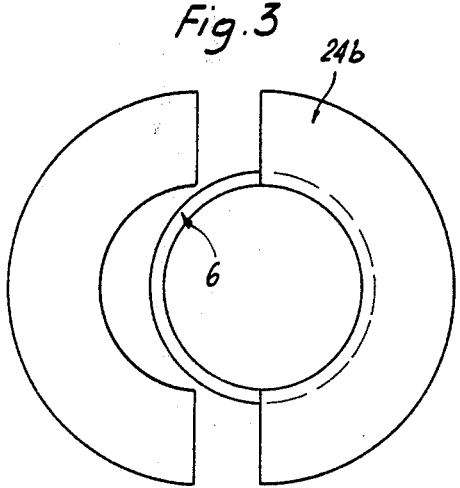 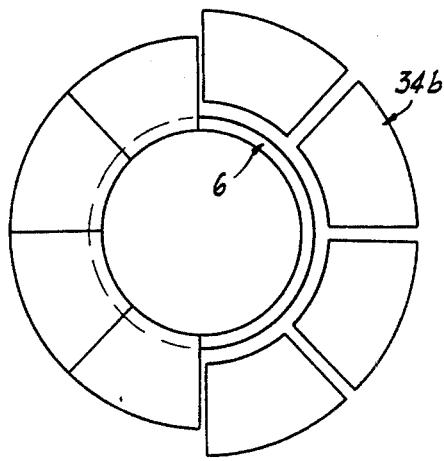

MOLD DEVICE FOR THE PRODUCTION OF HOLLOW BODIES FROM THERMOPLASTIC MATERIALS

This is a continuation of application Ser. No. 220,334, filed Jan. 24, 1972, and application Ser. No. 468,994, filed May 10, 1975, both now abandoned.

FIELD OF THE INVENTION

This invention relates to a mold device for producing hollow bodies from thermoplastic material and, more particularly, to a novel mold device arranged to produce hollow bodies having at least one undercut formed by radially offset circumferential wall portion, and to effect such production in a simple manner.

BACKGROUND OF THE INVENTION

It is known to produce hollow bodies, having at least one undercut formed by a radially offset circumferential wall portion, in two operations immediately succeeding each other. In a first mold, constituting an injection mold, a preform is produced on a core by injection molding, and the core, carrying the preform, is introduced into a second mold, constituting a blow mold, in which the preform is inflated to form a hollow body having the undercut. To be able to finish-shape such hollow bodies, it has been proposed to divide the blow mold in an axial plane and, after blow molding, to move the two mold parts radially apart into an open position so that the hollow body can be removed laterally normal to the direction of separation of the mold parts and through the gap created between the mold parts. This, of course, is possible only when the separation gap of the blow mold is somewhat larger than the largest diameter of the hollow body.

Particularly in the case of multiple molds, where several blow mold rows lie side-by-side in the separating direction, this leads to an undesirably great space requirement since, between two adjacent rows, a free space, allowing the separating movement, must always be present, and the width of this space must be somewhat greater than the largest diameter of the hollow body. To avoid this large space requirement transversely to the blow mold axis, it has been proposed to perform the finish-molding after the radial moving apart of blow molds doubly or multiple divided along axial planes, in an axial direction. However, in this case also the disadvantage remains that the blow mold is separated all the way along at least two generatrices, which not only means a complicated, expensive mold and relatively large closing or locking forces, but also leads inevitably to burr formation on the hollow bodies along the mold joints. Hollow bodies with perfectly smooth generated surfaces cannot be produced in this manner.

SUMMARY OF THE INVENTION

The mold device embodying the invention is designed to avoid the above-mentioned disadvantages of the prior art. For this purpose, the mold device of the invention includes a hollow mold, connected with the movable plate at least during the mold closing and opening phase. The hollow mold includes a onepiece main body and an at least two-piece auxiliary body forming the undercut. The parts of the auxiliary body are movable radially normally to the mold axis through at least the depth of the undercut so that, when the parts of the auxiliary body are moved outwardly, the produced blanks or hollow bodies can be removed from the main part or main body of the hollow mold in an axial direction.

As the auxiliary body forms only the undercut portions, which are always relatively small, comprising, for example, the bottom portion or free edge portion of a hollow body, the burrs resulting from the division of the auxiliary body are limited to the small undercut portions of the hollow body. However, the main wall area of the hollow produced by the mold device remains burr-free, and hence perfectly smooth, owing to the one-piece main body of the hollow mold. Conduction, movement and locking of the relatively small moveable parts of the auxiliary body necessarily are easier to effect than with a mold which is completely divided throughout its length.

An object of the invention is to provide an improved mold device for the production, from thermoplastic material, of hollow bodies having at least one undercut formed by a radially offset circumferential wall portion.

Another object of the invention is to provide such a mold device which is free of the disadvantages of prior art mold devices for this purpose.

A further object of the invention is to provide such a mold device including a hollow mold and a moveable mold plate which are interconnected during a least the mold closing and opening phases.

Another object of the invention is to provide such a mold device in which the hollow mold is formed by a one-piece main body and a plural-part auxiliary body forming the undercut and having its parts radially movable normal to the axis of the hollow mold through at least the radial extent of the undercut.

For an understanding of the principles of the invention, reference is made to the following description of typical embodiments thereof as illustrated in the accompanying drawing.

BRIEF DESCRIPTION OF THE DRAWING

In the Drawing:

FIG. 1 is a somewhat diagrammatic axial sectional view of one embodiment of a combined injection and blow mold device embodying the invention;

FIG. 2 is a view, similar to FIG. 1, of another combined injection and blow mold device embodying the invention;

FIG. 3 is an elevation view, on a larger scale, of a blow mold with a two-part auxiliary body; and FIG. 4 is a view similar to FIG. 3 of a blow mold comprising a multi-part auxiliary body.

DESCRIPTION OF THE PREFERRED EMBODIMENTS

Referring to FIG. 1, the mold drive device illustrated therein includes an injection unit 1, an injection mold 2, a core plate 3 with cores 3a extending in both directions therefrom, and a blow mold 4 carried by a movable mold plate 5. Blow mold 4 has a one-part main body 4a, for the formation of the main portion 6a of the hollow body 6 to be produced and, on its side away from mold plate 5, a multi-part auxiliary body 4b with radially movable parts for the formation of the undercut opening edge portion 6b of the hollow body 6. Main portion 4a of mold 4, which is illustrated as conical, alternatively may be cylindrical.

For reasons of space, the axial distance between the two molds 2 and 4 is illustrated too small in the drawing, and, in reality, this distance is at least large enough that cores 3a can be moved completely out of mold 2, and the entire core device rotated 180° between the two molds. In the normal case, core plate 3 will have, on each side, several, for example three, cores 3a arranged side-by-side, and there may be provided several molds 2 and 4 with a number of cavities each corresponding to the respective number of cores, for example three.

When producing a hollow body 6, the first step is to produce a preform 7 in injection mold 2 with core 3a inserted therein, and through the medium of injection unit 3. Then core 3a is moved radially out of injection mold 2 with preform 7 seated thereon, as illustrated in FIG. 1. Core plate 3 then is rotated 180°, in the plane of the drawing as shown in FIG. 1, so that now blow mold 4 can be moved up over the preform by means of mold plate 5. During the then occuring blowing operation, effected, for example, by supplying compressed air through core 3a with or without the aid of a vacuum applied to mold 4, the hollow body 6, with the undercut in the area of the auxiliary mold body 4b, is produced. Following this, blow mold 4 is pulled away from core 3a through the medium of movable plate 5, and to an extent such that the distance between core 3a and blow mold 4 permits axial discharge of hollow body 6 from the blow mold.

In order to eject hollow body 6, by means of an ejector 8 extending through mold plate 5, or by means of compressed air acting on the bottom of the hollow body, from blow mold 4 toward core 3a, first the segment-forming parts of auxiliary body 4b must be moved radially outwardly from their operating position shown in FIG. 1 and through a distance sufficient to permit passage of the largest diameter circumferential portion of hollow body 6. Examples of the auxiliary hollow mold bodies are illustrated in FIGS. 3 and 4.

Referring to FIGS. 3 and 4, the auxiliary mold body 24b shown in FIG. 3 is a two-part mold body. One of its two semicircular segments is shown in the operating position, while the other segment is illustrated as moved radially outwardly into the ejection position. It will be apparent that the amount of this radial outward displacement is smaller than the radius of the hollow body 6. This displacement path, and hence the space requirement of the blow mold, becomes still smaller when the auxiliary body is not only two-part but is multi-part. Such an example is illustrated in FIG. 4, wherein an eight-part auxiliary body 34b is shown. The individual segments of body 34b need be moved radially outwardly only a relatively little amount for complete release of the hollow body 6.

With the apparatus shown in FIG. 1, conical hollow bodies 6, with undercut opening edge portions 6b in the area of the greatest diameter of the hollow body, are produced. As has been mentioned, in the arrangement of FIG. 1, the mold plate 5 and blow mold 4 remain connected with each other during the forming-out of hollow body 6.

To enable production of conical hollow bodies with undercut edge portions lying in the area of the smallest diameter of the hollow body, in the apparatus shown in FIG. 2, blow mold 14 and movable mold plate 15 are axially separable. After the blowing operation, in this case also blow mold 14 and mold plate 15 are pulled completely away from core 3a. After this, or simultaneously therewith, the segments of auxiliary body 14b are moved radially outwardly until they release the undercut edge portion 16b of hollow body 16. At this time, mold plate 15 is separated from blow mold 14 and, together with hollow body 16 adhering thereto, is moved axially away from blow mold 14 until the space between blow mold 14 and mold plate 15 permits a radial removal of hollow body 16 from the apparatus. The separation of hollow body 16 from mold plate 15 again can be effected either by an ejector or pneumatically. It will be understood that in the case of the arrangement shown in FIG. 2, as well as in that shown in FIG. 1, the auxiliary body 14b can be designed as shown in either FIG. 3 or FIG. 4 or, either as a two-part auxiliary body or as a multi-part auxiliary body.

The auxiliary body segments may be guided for radial movement directly at the end face of the main body of the blow mold, or on a guide ring connected therewith. Their outer ends are connected, in a manner not shown, with a displacement mechanism which, at the same time, provides for locking of the segments in their operating position.

The mold devices described above are very space-saving, which is effective especially in constructions with multiple molds. As the parts of the blow mold to be moved are small in relation to the size of the one-piece main body of the blow mold, also the structural costs and the necessary operating forces are relatively low. Moreover, hollow bodies with relatively minor burr formation can be produced.

While specific embodiments of the invention have been shown and described in detail to illustrate the application of the principles of the invention, it will be understood that the invention may be embodied otherwise without departing from these principles.

I claim:

1. Injection blow molding equipment for producing, from thermoplastic material, hollow containers having a closed bottom and a reduced open neck with intervening side walls, comprising an injection mold having an open ended cavity for shaping a parison, a blow mold having an open ended cavity for shaping the container being produced, the injection and blow molds being spaced from each other and positioned with the open ends of their cavities presented toward each other along a common axis line, a mold core mounted between the molds and having a pivotal axis extended transverse to said axis line and providing for pivotal movement of the core between positions presented alternatively toward the open ends of the injection and blow molding cavities, means providing for relative displacement movement of the core and the molds toward and away from each other along said axis line, said pivotal and displacement movement of the core providing for insertion of the core into the injection mold for the molding of a parison on the core and for insertion of the molded parison and core into the blow mold, the blow mold comprising a joint-free tubular side wall portion defining the side wall of said blow mold cavity and a separable bottom wall at the end of the tubular side wall portion opposite to the open end of the cavity, means for relatively separating the bottom wall and side wall portion of the blow mold in a direction along said axis line sufficiently to provide for ejection of the blown container from the side wall portion through an opening in the side wall portion adjacent the bottom wall in the direction of said axis line, and a neck ring positioned and shaped to define the reduced neck of the hollow article being produced, the neck ring being formed of at least three segments each radially movable with respect to the mold cavity to provide for disengagement from the reduced neck of the hollow article being produced, the neck ring being mounted adjacent the open end of the mold and remaining with the mold after relative separation of the core and mold.

* * * * *